INVENTOR
JAMES H. LESLIE, JR.

ATTORNEYS

June 7, 1955  J. H. LESLIE, JR  2,709,862
HOG OR LIVESTOCK GATE
Filed April 19, 1954  2 Sheets-Sheet 2
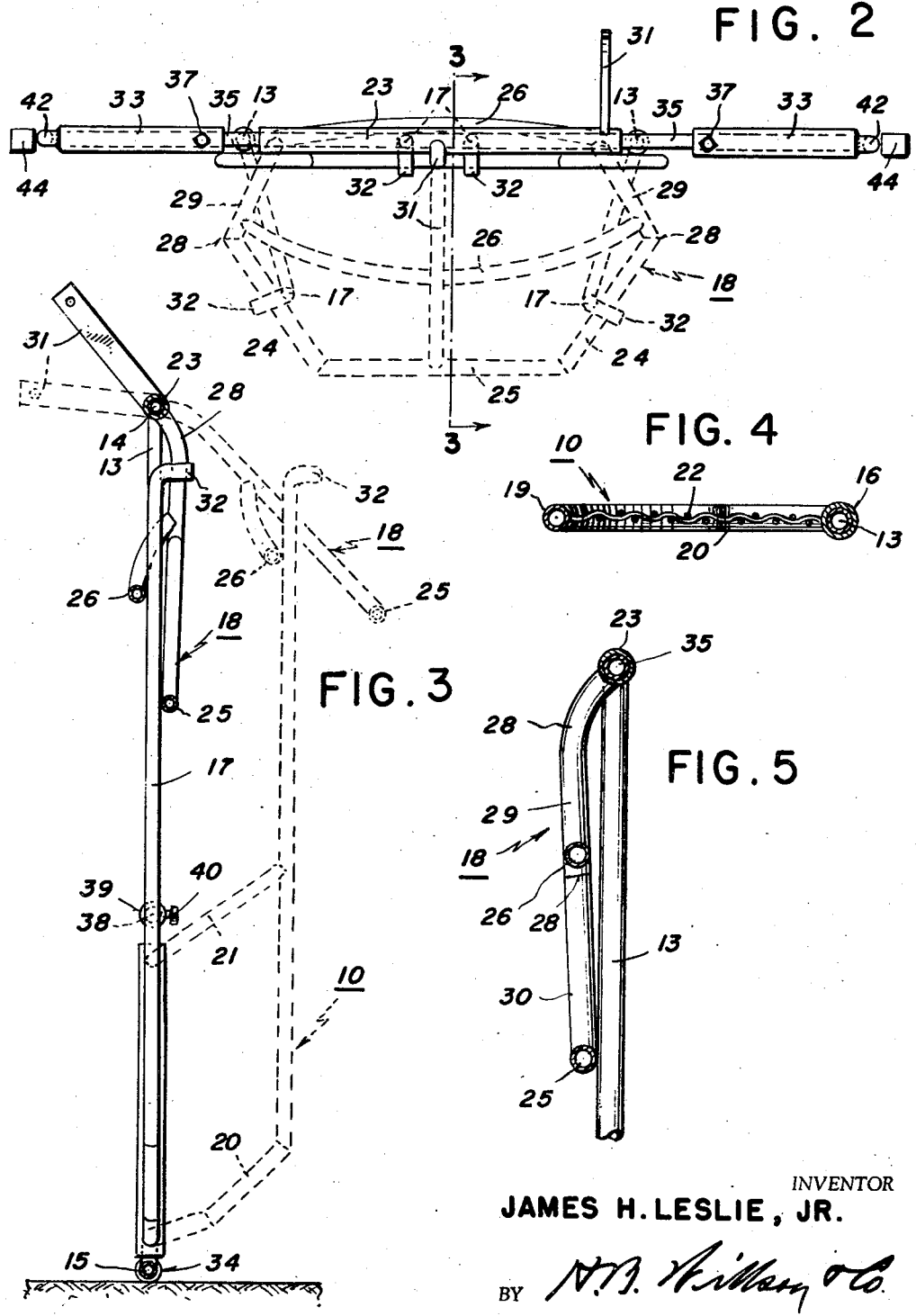
INVENTOR
JAMES H. LESLIE, JR.
ATTORNEYS

United States Patent Office 2,709,862
Patented June 7, 1955

2,709,862

HOG OR LIVESTOCK GATE

James H. Leslie, Jr., Hutchinson, Kans.

Application April 19, 1954, Serial No. 423,996

10 Claims. (Cl. 39—23)

This invention relates to livestock gates of the type which permit a hog or other animal to pass in one direction through a chute or passageway and prevent its return.

In handling and loading of hogs it frequently happens that after a number of hogs have passed through the chute into the car or other vehicle some of them will attempt to run back. The principal object of the invention is to provide a practical and effective one-way gate means across a chute which the hog or other animal pushes open and which will close behind the animal so as to prevent its return.

Another object of the invention is to provide a one-way gate means of this character in which two opposed horizontally swinging doors or gate members will lift a vertically swinging weight member as the animal pushes them open, the weight member coacting with uprights on the free ends of the gates or doors so as to return them to closed positions and prevent them from swinging in the opposite direction past their closed positions.

Another object is to provide, in connection with a gate mechanism of the above indicated character a frame having adjustable side sections to permit of the use of the device in chutes, fence openings and other passageways of different widths.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 2 is a top plan view of the same and also showing in dotted lines the two doors in open positions;

Fig. 3 is a vertical sectional view taken substantially on the line 3—3 in Fig. 2 looking in the direction of the arrows;

Fig. 4 is an enlarged detail horizontal section taken on line 4—4 in Fig. 1; and Fig. 5 is an enlarged detail vertical section taken on line 5—5 in Fig. 1.

Figure 1:
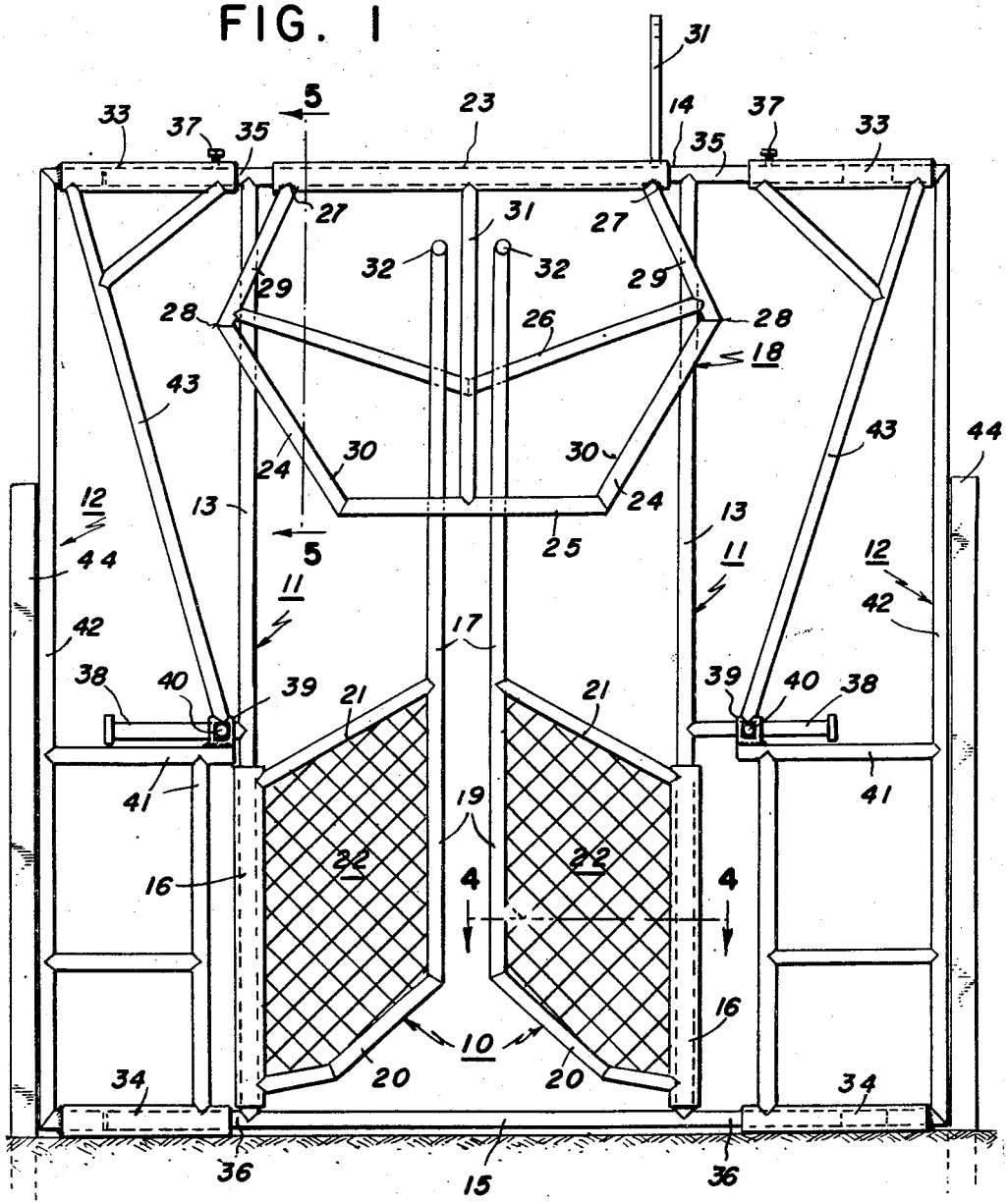
Fig. 1 is a front elevation of the exit side of my improved gate mechanism, the doors or gate members being shown in closed positions.

Referring more in detail to the drawings the numeral 10 denotes two opposed horizontally swinging doors or gate members disposed in the lower portion of an opening in an upright frame designated generally by the numeral 11. This main frame is to be mounted transversely of a chute, an opening in a fence or any passageway; and if desired, on each side of it may be mounted an adjustable side frame section 12, hereinafter described so that the device or mechanism may be used in chutes or passageways of different widths. While the frame may be variously constructed I preferably make it of sections of pipes, rods or bars welded to each other. As shown the main frame 11 comprises two horizontally spaced upright side members 13 connected at their upper ends by a top member 14 and at their lower ends by a bottom member 15. These members may be sections of pipe or tubular bars welded together. When so constructed the doors or gates 10 may have at their inner ends pipe sections 16 which rotate on the lower portions of the pipes or tubes 13 to support the doors for swinging movement. The doors are preferably shaped as shown in Fig. 1, so that when closed their free ends are slightly spaced apart and their lower corners are beveled or cutaway to facilitate their being pushed open by a hog. Rising from the free end portion of each door is an upright 17 which extends to near the top of the frame and which coacts with a vertically swinging weight member 18 so that the latter and the doors are interconnected for simultaneous movement as later described. The upright bars may be formed by the upper portions of pipe sections, the lower portions of which bound the free edges 19 and the bottom edges 20 of the doors. Another pipe section 21 forms the top edge of each door. The parts 16, 21, 19 and 20 are welded together and form a frame to which is fastened a covering 22 of sheet metal or wire mesh.

The weight member 18 extends lengthwise across the upper portion of the opening in the main frame above the doors and swings upwardly and outwardly from one side of the frame. While that member may be variously constructed, it is shown as a rigid unitary frame comprising a pipe section or tube 23 mounted to rotate on the cylindrical top bar or pipe 14 between the two side members 13 and an open frame suitably fastened to the tube 23. The open frame-like portion of the weight member is preferably formed of pipe sections or bars welded together and comprises two side bars 24, an outer connecting bar 25 and an inner connecting bar 26. The bars 24, 24 and 25 may be formed by a single section of pipe the ends of which are welded at 27 to one side of the hinge or bearing tube 23 adjacent the ends of the latter. These parts are disposed in a single plane but the side bars 24 are oppositely bowed or bent longitudinally between their ends at 28 to form converging inner portions 29 and converging outer portions 30, the latter being connected by the outer bar 25. The width of the frame at the bent portions 28 is greater than the space between the side members 13 so that the former will contact the latter when the weight member is in a substantially vertical position. The inner connecting bar 26 is bent longitudinally at its center so that it is bowed or V-shaped, and its ends are welded to the inner portions 29 of the two side bars at points spaced from the bends 28. This bowed or substantially V-shaped bar 26 is disposed in a single plane which diverges slightly outwardly from the plane of the bars 24, 24, 25. To strengthen the frame a central bar 31 is welded to the bar 26 and has one end welded to the outer bar 25 and its other end welded to the tube 23, as shown in Fig. 1.

The interconnection between the swinging weight member and the doors is accomplished by having the upper portions of the upright elements 17 extend through and movable in a suitable opening or openings in the weight member; and when the latter is constructed as illustrated, the opening is the space between the bars 26 and 25 and the outer portions of the arms 24. It will be seen on reference to Fig. 1 that when the animal pushes the doors toward open positions, the uprights 17 will thrust against and slide along first the outer bar 25 and then the outer portions 30 of the side bars 24, thereby lifting or swinging the member about the top bar 14 as a hinge pivot. If the animal is large enough to open the doors to their fully opened positions, the uprights 17 will be stopped by the bent portions 28 and the end portions of the bar 26. After the animal has passed through the gate, the weight of the member 18 will cause the bars 24 to thrust against the uprights 17 and the latter will slide along the outer portions 30 of the side bars 24 to bar 25. Uprights 17 will then be further forced to slide along bar 25, by the weight of member 18 dropping down, thereby causing the doors to be moved to their closed positions, the position shown in Fig. 1. At that time the bent portions 28 will contact with the side bars or posts 13 and the doors will be prevented from swinging past their closed positions.

If desired means may be provided for manually opening the doors. Such means may include a radially projecting lever 31 welded to the tube 23. By pulling back on lever and raising weight member 18, bar 26 being a V or wedge forces uprights 17 to slide along bar 26 to the ends which join bars 29 thus opening the doors. Also if desired the upper ends of the uprights 17 may be provided with stops 32 to limit the upward swinging movement of the weight member, as by bending the upper ends of the uprights.

To permit the gate mechanism to be used in passageways of different widths, I preferably employ the side frame sections or panels 12 which are slidably mounted on the opposite sides of the main frame 11, athough the side bars 13 of the latter can be so spaced that they may be suitably fastened directly to the opposite sides of a chute or to the gate posts in a fence. As shown the adjustable side sections 12 are the full height of the main frame 11 and include upper and lower tubes 33 and 34 adapted to respectively telescope over extensions 35 and 36 of the respective top and bottom bars 14 and 15. If desired set screws 37 may be used on the tubes to engage the extensions and hold the side sections in adjusted positions, or I may weld to the side bars 13 rods 38 to slide in sleeves 39 carrying set screws 40 and suitably fastened to the side frames. The latter may be variously constructed and each includes a lower open-work panel portion 41 to which the sleeve 39 is fastened. As shown each side frame is composed of pipe sections or rods welded together. The tubes 33 and 34 are telescoped over and welded to the bent ends of upright pipes 42 to which the horizontal bars of the panel 41 are also welded. At least one upright bar of the panel is welded to the tube 34; and a diagonal brace 43 is provided between each upper tube 33 and the adjacent pipe 42 at the top of the panel 41. The pipes 42 may be fastened in any suitable manner to parts 44 which conventionally represent the side walls of a chute or a pair of gate posts in a fence.

It is believed the use and operation of the gate mechanism will be fully understood from the foregoing detailed description, but it is to be noted that the device has but few parts all of which are of strong and sturdy construction.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A gate mechanism of the character set forth compising an upright frame having an opening therein, a pair of opposed doors disposed at said opening and mounted on said frame for horizontal swinging from closed to open positions, an upright bar rising vertically from the free end portion of each of said doors and rigid therewith, and a weight member at the top of said opening and extending lengthwise thereof, said member being mounted for vertical swinging from the top of said frame on one side thereof, said member being a rigid unitary frame having an open portion through which said upright bars extend to interconnect said weight member and said doors for simultaneous movement.

2. A gate mechanism of the character set forth comprising an upright frame including two upright horizontally spaced side members and a top member connecting them, a pair of opposed doors supported from said side members to swing horizontally, an upright bar rising vertically from and rigid with the free end portion of each of said doors, and an open frame weight member formed by a rigid unitary frame pivotally connected to said top member to swing vertically on one side of said frame, said upright bars projecting through the open portion of the weight member, whereby when the doors are pushed open from said one side of the frame, said upright bars will act on the weight member to swing it upwardly, and when the doors are released the weight member will act on said upright bars to swing the doors to closed positions.

3. A gate mechanism of the character set forth comprising an upright frame including two upright horizontally spaced side members and a top member connecting them, a pair of opposed doors supported from said side members to swing horizontally, uprights rising from the free end portions of said doors, and an open-frame weight member supported from said top member to swing vertically on one side of said frame, said uprights being disposed in the open portion of the weight member, whereby when the doors are pushed open from said one side of the frame, said uprights will act on the weight member to swing it upwardly, and when the doors are released the weight member will act on the uprights to swing the doors to closed positions, said weight member having a width greater than the spacing of said side members to abut the latter when the doors are in closed positions and prevent the doors from being swung in the opposite direction.

4. A gate mechanism of the character set forth comprising an upright frame including two upright horizontally spaced side members and a top member connecting them, a pair of opposed doors supported from said side members to swing horizontally, uprights rising from the free end portions of said doors, and an open-frame weight member supported from said top member to swing vertically on one side of said frame, said uprights being disposed in the open portion of the weight member, whereby when the doors are pushed open from said one side of the frame, said uprights will act on the weight member to swing it upwardly, and when the doors are released the weight member will act on the uprights to swing the doors to closed positions, said weight member including two opposed side bars connected by spaced outer and inner connecting bars, said uprights projecting between said connecting bars and coacting therewith.

5. The structure of claim 4 in which said outer connecting bar and said side bars are disposed in the same plane and said side bars have between their ends bent portions adapted to engage said side members of the frame when the doors are in closed positions, and in which said inner connecting bar is of angular shape and disposed in a plane which diverges outwardly from the first mentioned plane.

6. A gate mechanism of the character set forth comprising an upright frame including two upright horizontally spaced side members and a top member connecting them, a pair of opposed doors supported from said side members to swing horizontally, uprights rising from the free end portions of said doors, and an open-frame weight member supported from said top member to swing vertically on one side of said frame, said uprights being disposed in the open portion of the weight member, whereby when the doors are pushed open from said one side of the frame, said uprights will act on the weight member to swing it upwardly, and when the doors are released the weight member will act on said uprights to swing the doors to closed positions, together with extensible side frames slidably mounted on said upright frame for adjustment toward and from said side members, and means for fastening said side frames in adjusted positions.

7. A gate mechanism of the character set forth comprising an upright frame including two upright horizontally spaced side members and a top member connecting them, a pair of opposed doors supported from said side members to swing horizontally, uprights rising from the free end portions of said doors, and an open-frame weight member supported from said top member to swing vertically on one side of said frame, said uprights being disposed in the open portion of the weight member, whereby when the doors are pushed open from one side of the frame, said uprights will act on the weight member to swing it upwardly, and when the doors are released the weight member will act on said uprights to swing the doors to closed positions, said top member being a cylindrical bar and said weight member comprises a tubular bar rotatable on said cylindrical bar and an open frame comprising two side bars fixed at one end to said tubular bar and connected at their other ends by an other connecting bar, and also an inner connecting bar spaced from said outer bar and connected at its ends to the intermediate portions of said side bars, said uprights projecting between said outer and inner connecting bars.

8. A gate mechanism of the character set forth comprising an upright frame including two upright horizontally spaced side members and a top member connecting them, a pair of opposed doors supported from said side members to swing horizontally, uprights rising from the free end portions of said doors, and an open-frame weight member supported from said top member to swing vertically on one side of said frame, said uprights being disposed in the open portion of the weight member, whereby when the doors are pushed open from said one side of the frame, said uprights will act on the weight member to swing it upwardly, and when the doors are released the weight member will act on said uprights to swing the doors to closed positions, said upright members being pipe sections connected at their upper ends by an upper horizontal pipe section which forms said top member and connected at their lower ends by a lower horizontal pipe section, each of said doors having at its inner end a pipe section rotatable on the lower portion of one of the upright pipe sections, said weight member comprising a pipe section rotatable on said upper horizontal pipe and an open frame composed of two side bars fixed at one end to said last mentioned rotatable pipe section and connected at their other ends by an outer connecting bar, and also an inner connecting bar spaced from said outer bar and connected at its ends to the intermediate portions of said side bars, said uprights projecting between said outer and inner connecting bars.

9. The structure of claim 8 in which said upper and lower horizontal pipe sections are extended beyond said pipe sections forming said upright members, together with extensible side frames disposed at each side of said upright frame and including upper and lower tubes which telescope over the said extending ends of said horizontal pipe sections for the slidable adjustment of said side frames, and means for fastening said side frames in adjusted positions.

10. A one-way livestock operated gate mechanism comprising an upright frame having opposed sides connected by a horizontal top member to outline a livestock opening in the frame, a pair of opposed horizontally swinging doors at said opening and pivotally mounted on said sides of the frame to move from closed positions in which they are longitudinally alined to open positions on one side of the frame, the free ends of said doors being spaced apart when in closed positions, an upright bar at the free end portion of each door rising vertically above the top of the door and terminating beneath the plane of said top member, and a vertically swingable weight member disposed on said one side of said frame above the tops of said doors, means suspending the top of said weight member on a horizontal pivotal axis from said top member of the frame, said weight member being a rigid unitary frame having an open portion through which said upright bars project to interconnect said weight member and said doors, whereby when the doors are pushed open from said one side of the upright frame, said bars will act on the weight member to swing it upwardly, and when the doors are released the weight member will act on said upright bars to swing the doors to closed positions.

References Cited in the file of this patent

UNITED STATES PATENTS

| | | |
|---|---|---|
| 353,298 | Eckert | Nov. 30, 1886 |
| 461,114 | Hirsch | Oct. 13, 1891 |
| 1,963,212 | Phillips | June 19, 1934 |
| 2,273,690 | Bowers | Feb. 17, 1942 |